United States Patent
Farrand et al.

(10) Patent No.: US 10,428,220 B2
(45) Date of Patent: Oct. 1, 2019

(54) PARTICLES FOR ELECTROPHORETIC DISPLAYS

(71) Applicant: Merck Patent GmbH, Darmstadt (DE)

(72) Inventors: Louise Diane Farrand, Dorset (GB); Claire Topping, Southampton (GB); Mark John Goulding, Ringwood (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/537,513

(22) PCT Filed: Nov. 23, 2015

(86) PCT No.: PCT/EP2015/002348
§ 371 (c)(1),
(2) Date: Jun. 19, 2017

(87) PCT Pub. No.: WO2016/096080
PCT Pub. Date: Jun. 23, 2016

(65) Prior Publication Data
US 2018/0037743 A1    Feb. 8, 2018

(30) Foreign Application Priority Data
Dec. 19, 2014  (EP) .................................... 14004312

(51) Int. Cl.
*C09B 69/10* (2006.01)
*C08F 220/14* (2006.01)
(Continued)

(52) U.S. Cl.
CPC .......... *C09B 69/106* (2013.01); *C08F 220/14* (2013.01); *C08F 220/18* (2013.01);
(Continued)

(58) Field of Classification Search
CPC ... C09B 69/106; C09B 31/043; C09B 31/053; C09B 67/22; C09B 1/28; C08F 220/14;
(Continued)

(56) References Cited

U.S. PATENT DOCUMENTS

| | | | |
|---|---|---|---|
| 5,380,362 | A | 1/1995 | Schubert |
| 5,403,518 | A | 4/1995 | Schubert |

(Continued)

FOREIGN PATENT DOCUMENTS

| | | | | |
|---|---|---|---|---|
| GB | 2438436 A | | 11/2007 | |
| JP | 2007286123 | * | 11/2007 | ............. G02F 1/167 |

(Continued)

OTHER PUBLICATIONS

International Search Report for PCT/EP2015/002348 dated Jan. 28, 2016.

(Continued)

*Primary Examiner* — Bijan Ahvazi
(74) *Attorney, Agent, or Firm* — Drinker Biddle & Reath LLP

(57) ABSTRACT

This invention relates to polymer particles, a process for their preparation, the use of these particles for the preparation of an electrophoretic device, and electrophoretic displays comprising such particles.

16 Claims, 4 Drawing Sheets

Figure 1:
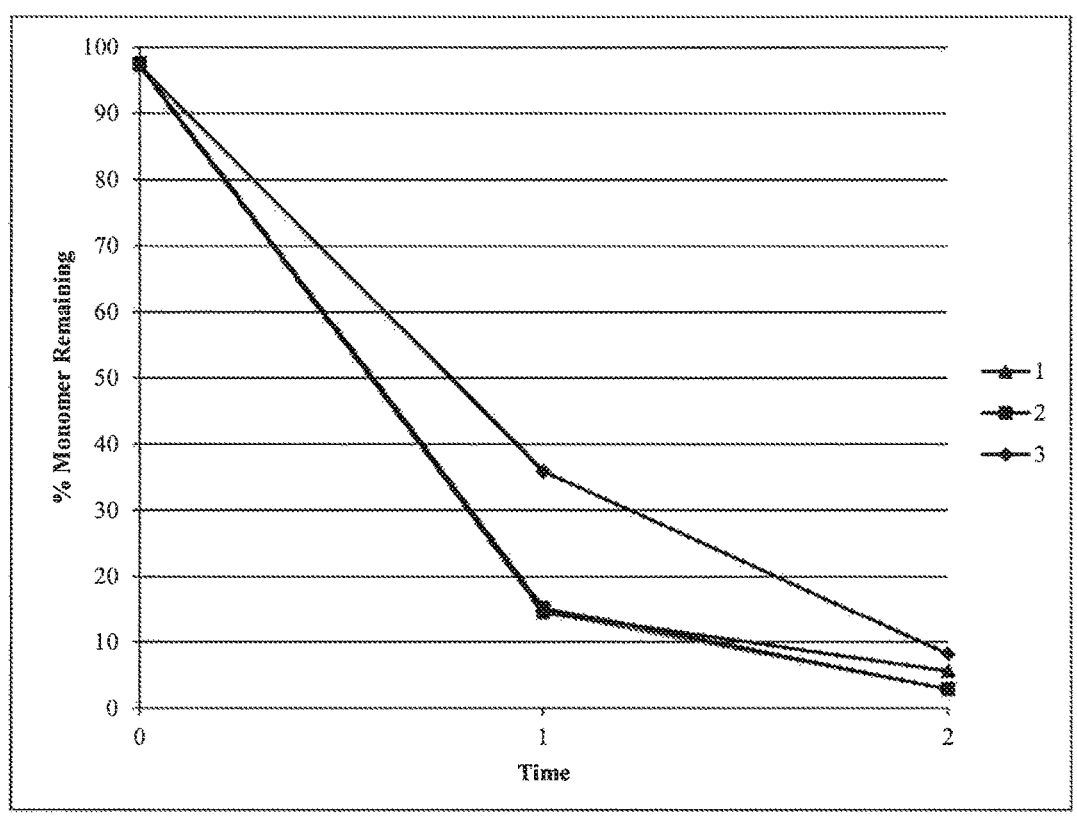

(51) Int. Cl.
*C09D 11/50* (2014.01)
*G02F 1/167* (2019.01)
*C08F 220/18* (2006.01)
*G02F 1/1675* (2019.01)

(52) U.S. Cl.
CPC .............. *C09D 11/50* (2013.01); *G02F 1/167* (2013.01); *G02F 2001/1678* (2013.01)

(58) Field of Classification Search
CPC .......... C08F 1/167; C08F 220/18; C08F 2/14; C08F 2/26; G02F 1/167; G02F 1/17; G02F 2001/1678; C09D 11/50
See application file for complete search history.

(56) References Cited

U.S. PATENT DOCUMENTS

| | | | |
|---|---|---|---|
| 5,783,614 A | 7/1998 | Chen et al. | |
| 6,194,488 B1 | 2/2001 | Chen et al. | |
| 6,464,898 B1 | 10/2002 | Tomoike et al. | |
| 6,956,690 B2 | 10/2005 | Yu et al. | |
| 7,038,655 B2 | 5/2006 | Herb et al. | |
| 7,052,766 B2 | 5/2006 | Zang et al. | |
| 7,110,162 B2 | 9/2006 | Wu et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,247,379 B2 | 7/2007 | Pullen et al. | |
| 7,277,218 B2 | 10/2007 | Hwang et al. | |
| 7,304,634 B2 | 12/2007 | Albert et al. | |
| 2007/0128352 A1 | 6/2007 | Honeyman et al. | |
| 2007/0268244 A1 | 11/2007 | Chopra et al. | |

FOREIGN PATENT DOCUMENTS

| | | | | |
|---|---|---|---|---|
| JP | 2007286123 A | | 11/2007 | |
| WO | WO-9910767 A1 | | 3/1999 | |
| WO | WO-2005017046 A2 | | 2/2005 | |
| WO | WO-2010089057 A2 | | 8/2010 | |
| WO | WO-2010104606 A1 | | 9/2010 | |
| WO | WO-2011017446 A1 | | 2/2011 | |
| WO | WO-2011075720 A1 | | 6/2011 | |
| WO | WO-2012019704 A1 | | 2/2012 | |
| WO | WO-2013079146 A1 | | 6/2013 | |
| WO | WO 2013170935 A1 | * | 11/2013 | ............ C08F 220/14 |
| WO | WO-2013170935 A1 | | 11/2013 | |
| WO | WO-2013170936 A1 | | 11/2013 | |

OTHER PUBLICATIONS

Written Opinion of the International Searching Authority for PCT/EP2015/002348 dated Jan. 28, 2016.

* cited by examiner

PARTICLES FOR ELECTROPHORETIC DISPLAYS

CROSS-REFERENCE TO RELATED APPLICATIONS

This application is a national stage application (under 35 U.S.C. § 371) of PCT/EP2015/002348, filed Nov. 23, 2015, which claims benefit of European Application No. 14004312.6, filed Dec. 19, 2014, both of which are incorporated herein by reference in their entirety.

This invention relates to polymer particles, a process for their preparation, the use of these particles for the preparation of an electrophoretic device, and electrophoretic displays comprising such particles.

BACKGROUND OF THE INVENTION

EPDs (Electrophoretic Displays) and their use for electronic paper are known for a number of years. An EPD generally comprises charged electrophoretic particles dispersed between two substrates, each comprising one or more electrodes. The space between the electrodes is filled with a dispersion medium which is a different colour from the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels. Mainly black and white particles are used. Available technologies of EPDs include electronic paper, commercially used in electronic books. This application uses black and white colour. The use of different coloured particles in a single pixel has been exemplified in recent patent literature (U.S. Pat. No. 7,304,634, GB 2 438 436, US 2007/0268244).

BRIEF SUMMARY OF THE INVENTION

There continues to be a need for improved electrophoretic fluids and coloured polymer particles which can be easily prepared and dispersed in non-polar media. Particularly, there is a need to improve the photostability of particles for use in EPD.

This object is solved by coloured polymer particles for use in electrophoretic devices according to claim 1 comprising at least one light stabiliser and monomer units of at least one monomer, at least one polymerisable dye, optionally of at least one charged co-monomer, optionally a core particle, and optionally of at least one crosslinking co-monomer, by a process for the preparation of such polymer particles, by the use of these particles for the preparation of an electrophoretic device, by electrophoretic fluids and devices comprising such particles.

DETAILED DESCRIPTION OF THE INVENTION

Preferably, polymerisable light stabilisers are used; especially polymerisable hindered amines. This invention relates specifically to the use of hindered amine light stabilisers (HALS) to improve the photostability of particles for use in EPD, especially HALS with polymerisable groups. HALS suitable for the invention preferably are sterically hindered piperidines, in particular compounds of Formula 1.

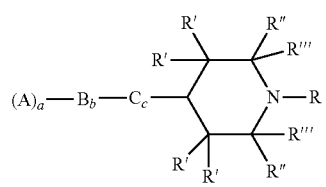

Formula 1

Where

R=H, linear or branched, substituted or non-substituted alkyl, cycloalkyl, or aryl, halogen, hydroxy or alkoxy, R'=independently H or linear or branched, substituted or non-substituted alkyl, preferably H, R''=independently H or linear or branched, substituted or non-substituted alkyl, R'''=independently H or linear or branched, substituted or non-substituted alkyl, A=a functional group, especially a polymerisable group or a hydroxy group, B=a spacer group, preferably a linear or branched alkylene group, where one or more non-adjacent C atoms may be replaced by O, N and/or S.

C is a single bond or O, NH, NR', or $CH_2$, $a \geq 1$ and b and $c \geq 0$.

Preferably, at least one of R'' and/or R''' is not H.

Polymerisable HALS preferably comprise at least one polymerisable group, preferably polymerisable groups comprising a C—C double bond.

Polymerisable groups are preferably acryl or methacryl groups.

In particular, polymerisable HALS of Formula 2 are used:

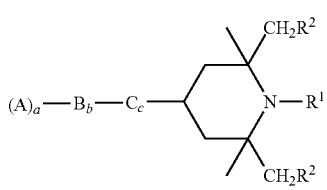

Formula 2

Where $R^1$=H, linear or branched, substituted or non-substituted alkyl or halogen, especially C1-C8 alkyl, especially C1-C3 alkyl, $R^2$=independently H or linear or branched, substituted or non-substituted alkyl, especially H, A=a polymerisable group, especially an acrylate, methacrylate, acrylamide or methacrylamide group, or a hydroxy group, B=a spacer group, preferably a linear or branched alkylene group, where one or more non-adjacent C atoms may be replaced by O, N and/or S.

C is a single bond or O, NH, NR', $CH_2$, and $a \geq 1$ and b and $c \geq 0$.

Especially preferred are compounds of Formula 3:

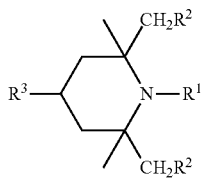

Formula 3

Where $R^1$=H, linear or branched, substituted or non-substituted alkyl, especially C1-C8 alkyl, cycloalkyl, or aryl, halogen, hydroxy or alkoxy, especially H, alkyl or halogen, preferably C1-C3 alkyl, $R^2$=independently H or linear or branched, substituted or non-substituted alkyl, preferably H, $R^3$=a polymerisable group, especially an acrylate, methacrylate, acrylamide or methacrylamide group.

In particular, light stabilisers shown in Table 1 can be used.

TABLE 1

| 1 | 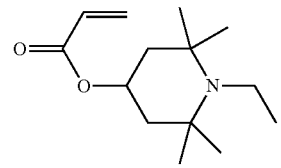 |
| --- | --- |
| 2 | 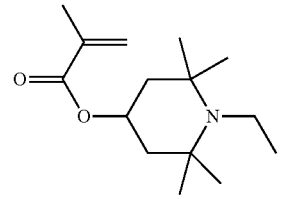 |
| 3 | 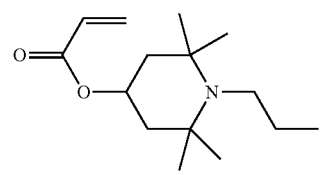 |
| 4 | 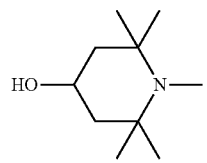 |
| 5 | 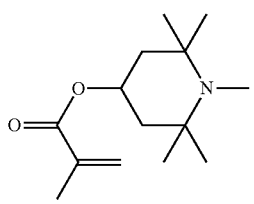 [SMILES: C=C(C)C(=O)OC1CC(C)(C)N(C)C(C)(C)C1] |

TABLE 1-continued

| 6 | 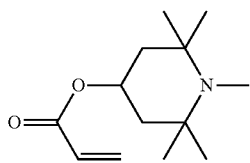 |
| --- | --- |
| 7 | 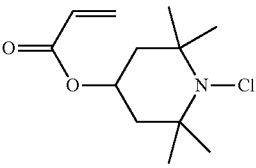 |
| 8 | 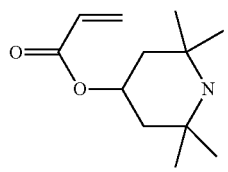 |
| 9 | 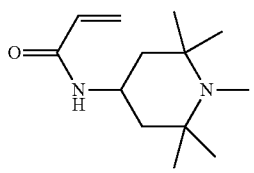 [SMILES: C=CC(=O)NC1CC(C)(C)N(C)C(C)(C)C1] |

Compounds 1 and 2 are particularly preferred.

The invention makes use of HALS in dyed polymeric particles prepared using a water-free dispersion polymerisation, especially suited to preparation of fluids for use in EPD. The incorporation of HALS chemically entangled into the polymer shows a measured improvement in light stability. The HALS monomer, once polymerised into the particle, cannot leach out into the fluid over time. Leaching of a non-polymerised HALS could have detrimental effects on the EPD fluid, such as unwanted chemical or physical reactions with, for example, surfactants; and loss of photostability protection where it is required most, i.e. in the particle near the dye and polymer.

Particles according to the invention show improved photostability, e. g. improved light-fastness and/or prevention of degradation. Dyes used in coloured particles often faded over time, particularly in the case of cyan and black dyes. As EPD devices are made to be used in ambient light and in particular are promoted to be used in bright sunlight conditions, the photostability of any coloured particles is an important factor to consider when making new products.

Especially, the photostability of pMMA microparticles has been improved by incorporation of polymerisable hindered amine light stabilisers into the particle. Advantageously, commercially available polymerisable hindered amine light stabilisers can be used. Unexpectedly, the presence of HALS in particle synthesis does not show any significant hindrance of the free-radical-polymerisation process.

Preferably, the particles are prepared by dispersion polymerisation as disclosed for example in WO 2012/019704, WO 2013/170935, and WO 2013/079146. Particles comprising a core particle, i. e. a pigment core, can preferably be prepared according to WO 2013/170936.

Usually, a monomer composition for the preparation of polymer particles according to the invention comprises at least one light stabiliser, at least one monomer, at least one initiator, at least one polymerisable dye, optionally at least one charged co-monomer, optionally a core particle, and optionally at least one cross-linking co-monomer. Preferably, a monomer composition according to the invention comprises a monomer providing the basic structure, a polymerisable light stabiliser, in particular a polymerisable hindered amine, a polymerisable dye, optionally a pigment particle, especially $TiO_2$, and an initiator. Preferably the polymerisation according to the invention is a free radical polymerisation.

Preferably, a simple 1-step reaction in a non-aqueous, preferably non-polar medium is used. The preferred solvents are non-polar hydrocarbon solvents, especially such used in EPD fluids, i.e. the Isopar series (Exxon-Mobil), Norpar, Shell-Sol (Shell), Sol-Trot (Shell), naphtha, and other petroleum solvents, as well as long chain alkanes such as dodecane, tetradecane, decane and nonane. Especially preferred is dodecane. Oil-soluble initiators are preferred in this dispersion polymerisation. Preferably the coloured polymer particles are simply separated from the reaction suspension by filtration, preferably by pouring the suspension through a pore size filter, i.e. a 50 µm pore size filter, or the particles can be cleaned by centrifuging.

The polymer particles of the invention can be prepared from most monomer types, in particular methacrylates, acrylates, methacrylamides, acrylonitriles, α-substituted acrylates, styrenes and vinyl ethers, vinyl esters, propenyl ethers, oxetanes and epoxys but would typically be prepared from largest percentage to be monomer, then cross-linker, and include a charged monomer (e.g. quaternised monomer). Especially preferred are methyl methacrylate and ethylene glycol dimethyl methacrylate as a cross-linker and 2-methacryloxy ethyl trimethyl ammonium chloride (MOTAC) as reactive charged monomer but many others could be used, the following are all examples of which could be used which are commercially available from the Sigma-Aldrich chemical company.

Methacrylates:

Methacrylic acid, Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol) methyl ether methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy)ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate. Preferably Methyl methacrylate (MMA), Ethyl methacrylate (EMA), Methacrylic acid, and/or n-Butyl methacrylate (BMA) are used.

Acrylates:

Acrylic acid, 4-Acryloylmorpholine, [2-(Acryloyloxy)ethyl]trimethylammonium chloride, acrylic acid, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol) ethyl ether acrylate technical grade, Di(ethylene glycol) 2-ethylhexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidised acrylate, 3-Sulfopropyl acrylate potassium salt, Tetrahydrofurfuryl acrylate, 3-(Trimethoxysilyl)propyl acrylate, 3,5,5-Trimethylhexyl acrylate. Preferably Methyl acrylate, Ethyl acrylate, Acrylic acid, and/or n-Butyl acrylate are used.

Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl)trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl)acrylamide, N-(Isobutoxymethyl)acrylamide, N-Isopropylacrylamide, N-Isopropylmethacrylamide, Methacrylamide, N-Phenylacrylamide, N-[Tris(hydroxymethyl)methyl]acrylamide, Styrenes Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene, N,N-Dimethylvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)styrene, 4-(Trifluoromethyl)styrene, 2,4,6-Trimethylstyrene. Preferably Styrene and/or Divinyl benzene are used.

Vinyl Groups

3-Vinylaniline, 4-Vinylaniline, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl)trimethylammonium chloride, 4-Vinylbiphenyl, 2-Vinylnaphthalene, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate.

Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above. Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl]adipate, Bis[4-(vinyloxy)butyl]1,6-hexanediylbiscarbamate, Bis[4-(vinyloxy)butyl]isophthalate, Bis[4-(vinyloxy)butyl](methylenedi-4,1-phenylene)biscarbamate, Bis[4-(vinyloxy)butyl]succinate, Bis[4-(vinyloxy)butyl]terephthalate, Bis[4-(vinyloxymethyl)cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol) divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl]phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane) tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediylbis[oxy(2-hydroxy-3,1-propanediyl)]bisacrylate, Hydroxypivalyl hydroxypivalate bis[6-(acryloyloxy)hexanoate], Neopentyl glycol diacrylate, Pentaerythritol diacrylate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo[5.2.1.0]decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl]isocyanurate, Tri(propylene glycol) diacrylate.

Optionally, the monomer composition comprises at least one charged co-monomer. Examples of cationic monomers for particle stability and particle size control are 2-methacryloxy ethyl trimethyl ammonium chloride (MOTAC), acryloxy ethyl trimethyl ammonium chloride (AOTAC), [3-(Methacryloylamino)propyl]trimethylammonium chloride, [2-(Methacryloyloxy)ethyl]trimethylammonium methyl sulfate solution, tetraallyl ammonium chloride, diallyl dimethyl ammonium chloride, (Vinylbenzyl)trimethylammonium chloride. Preferably 2-methacryloxy ethyl trimethyl ammonium chloride (MOTAC), acryloxy ethyl trimethyl ammonium chloride (AOTAC) and [2-(Methacryloyloxy)ethyl]trimethylammonium methyl sulfate solution are used.

Examples of anionic monomers are sodium, potassium or triethylamine salts of methacrylic acid, Acrylic acid, 2-(Trifluoromethyl)acrylic acid, 3-(2-Furyl)acrylic acid, 3-(2-Thienyl)acrylic acid, 3-(Phenylthio)acrylic acid, Poly(acrylic acid) potassium salt, Poly(acrylic acid) sodium salt, Poly(acrylic acid), Poly(acrylic acid, sodium salt) solution, trans-3-(4-Methoxybenzoy)acrylic acid, 2-Methoxycinnamic acid, 3-Indoleacrylic acid, 3-Methoxycinnamic acid, 4-Imidazoleacrylic acid, 4-Methoxycinnamic acid, Poly(styrene)-block-poly(acrylic acid), Poly(acrylonitrile-co-butadiene-co-acrylic acid), dicarboxy terminated, Poly(acrylonitrile-co-butadiene-co-acrylic acid), dicarboxy terminated, glycidyl methacrylate diester, 2,3-Diphenyl-Acrylic Acid, 2-Me-Acrylic Acid, 3-(1-Naphthyl)Acrylic Acid, 3-(2,3,5,6-Tetramethylbenzoyl)Acrylic Acid, 3-(4-Methoxyphenyl)Acrylic Acid, 3-(4-Pyridyl)Acrylic Acid, 3-p-Tolyl-Acrylic Acid, 5-Norbornene-2-Acrylic Acid, Trans-3-(2,5-Dimethylbenzoyl)Acrylic Acid, Trans-3-(4-Ethoxybenzoyl)Acrylic Acid, Trans-3-(4-Methoxybenzoyl)Acrylic Acid, 2,2'-(1,3-Phenylene)Bis(3-(2-aminophenyl)Acrylic Acid), 2,2'-(1,3-Phenylene)Bis(3-(2-Aminophenyl)Acrylic Acid) hydrochloride, 2,2'-(1,3-Phenylene)Bis(3-(2-Nitrophenyl)Acrylic Acid), 2-[2-(2',4'-Difluoro[1,1'-Biphenyl]-4-Yl)-2-Oxoethyl]Acrylic Acid, 2-(2-(2-Chloroanilino)-2-Oxoethyl)-3-(4-Methoxyphenyl)Acrylic Acid, 2-(2-((2-Hydroxyethyl)Amino)-2-Oxoethyl)-3-(4-Methoxyphenyl)Acrylic Acid, 2-(2-(Cyclohexylamino)-2-Oxoethyl)-3-(4-Methoxyphenyl)Acrylic Acid.

A preferred monomer composition comprises methyl methacrylate, dye monomer, polymerisable HALS, and optionally methacrylic acid. Preferably, an oil soluble initiator is used in the non-aqueous copolymerisation in order to control size, particle morphology and to reduce the residual monomers at the end of the reaction. Preferably an oil-soluble thermal initiator is added in the present process. Preferably 2,2'-Azobis(2.4-dimethyl valeronitrile), Dimethyl 2,2'-azobis(2-methylpropionate), 2,2'-Azobis(2-methylbutyronitrile) or Vazo 67 are used.

An essential component of the preferred process is a polymerisable dye. In general the polymerisable dyes are solvent soluble and they may be anionic, cationic or neutral. Preferably solvent soluble dyes are used. The function of the polymerisable dye is to colour the particle. The polymerisable dye consists of a chromophore, one or more polymerisable groups, optional linker groups (spacers), and optional groups to modify physical properties (like solubility, light fastness, etc.) and optionally charged group(s).

The polymerisable dye preferably comprises a chromophoric group and at least one functional group selected from polymerisable groups e.g. methacrylates, acrylates, methacrylamides, acrylonitriles, α-substituted acrylates, styrenes and vinyl ethers, vinyl esters, propenyl ethers, oxetanes and epoxys etc., in particular methacrylates and acrylates. The polymerised group may be attached directly to the chromophoric group or may be attached through a linker group. An example of a suitable linker group is an optionally substituted alkyl chain, a polyether alkyl chain, a cycloalkyl or aromatic ring, heteroaromatic ring or a combination thereof.

The chromophoric group preferably comprises of conjugated aromatic (including heteroaromatic) and or multiple bonds including: azo (including monoazo, bisazo, trisazo, linked azos etc), metallised azo, anthraquinone, pyrroline, phthalocyanine, polymethine, aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups. Preferred chromophoric groups are azo groups (especially monoazo, and bisazo), anthraquinone and phthalocyanine groups. Preferably the polymerisable dye comprises a chromophoric group and one or more functional groups selected from an acrylate or methacrylate backbone.

A polymerisable dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, bis- and trisazo compounds can be used to obtain blacks and other duller shades (navy blue, brown, olive green, etc).

Mixtures of polymerisable dyes can also be used to obtain the correct particle shade; for example a black from single component mixtures of brown and blue or yellow, magenta and cyan pre-polymerised dyes. Similarly shades can be tuned for example by adding small quantities of separate polymerisable dyes to modify the colour of the particles (e.g. 95% yellow and 5% cyan to get a greener yellow shade).

Modified polymerisable dyes (with reactive group(s)) from the application groups of reactive (anionic), direct (anionic), acidic (anionic) and basic (cationic) dyes as designated by the Colour Index (published by The Society of Dyers and Colourists with the American Association of Textile Chemists and Colorists e.g. $3^{rd}$ edition 1982) are preferred. The following are examples of dyes which can be used. Preferably dyes with more than one polymerisable group are used. In principle any polymerisable dye can be used, preferable with more than one polymerisable group (most preferably with 2 polymerisable groups) and preferably with a methacrylate or acrylate function. Additionally, a dye which is insoluble in non-polar type solvents could be used, for example a cationic or anionic dye, since this will not preferentially leach into the organic solvent phase but remain in a particle. Dyes, especially the preferred dyes, disclosed in WO 2010/089057, WO 2012/019704, WO 2013/079146, and WO 2013/170935 are advantageous for the present invention. Preferable examples of polymerisable dyes are summarised in the following Table.

TABLE 2

| Dye | Colour | Structure |
|---|---|---|
| Dye 1 | Cyan (E)-4,4'-(4-((2,6-dicyano-4-nitrophenyl)diazenyl)-2-methoxy-5-(3,5,5-trimethylhexanamido)phenylazanediyl) bis(butane-4,1-diyl)diacrylate | |
| Dye 2 | Magenta Acrylic acid 2-[[3-butyrylylamino-4-(4-cyano-3-methylisothiazol-5-ylazo)-phenyl]-(2-acryloyloxyethyl)-amino]-ethyl ester | |

TABLE 2-continued

| Dye | Colour | Structure |
|---|---|---|
| Dye 3 | Yellow 2,2'-(4-((5-cyano-1-(2-ethylhexyl)-2-hydroxy-4-methyl-6-oxo-1,6-dihydropyridin-3-yl)diazenyl)phenylsulfonylazanediyl)bis(ethane-2,1-diyl) diacrylate | |
| Dye 4 | Black 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl)bis(3-chloropropanoate) | |
| Dye 5 | Red 2,2'-(4-((4-Cyano-3-methylisothiazol-5-yl)diazenyl)phenylazanediyl)bis(ethane-2,1-diyl)bis(2-methylacrylate) | |
| Dye 6 | Magenta (2,2'-(3-Acetamido-4-((4-butyl-2,6-dicyanophenyl)diazenyl)phenylazanediyl)bis(ethane-2,1-diyl)bis(2-methylacrylate) | |

The synthesis of most preferred dyes is disclosed in WO 2010/089057, WO 2012/019704, WO 2013/079146, and WO 2013/170935.

Particles of the invention may comprise core particles, especially an inorganic pigment particle. Preferably, white reflective particles are used having a refractive index of ≥1.8, especially ≥2.0, are used. Especially titanium dioxide (titania), zinc oxide, silicon dioxide, alumina, barium sulphate, zirconium dioxide, zinc sulfite, calcium carbonate, cerussite, kaolinite, diantimony trioxide and/or tin dioxide, especially titanium dioxide, can be used. Preferably, titanium dioxide based pigments are used which could have the rutile, anatase, or amorphous modification, preferably rutile or anatase. Examples are: Sachtleben RDI-S, Sachtleben R610-L, Sachtleben LC-S, Kronos 2081, Kronos 2305, Sachtleben Hombitan Anatase, Sachtleben Hombitan Rutile, Du Pont R960, Du Pont R350, Du Pont R104, Du Pont R105, Du Pont R794, Du Pont R900, Du Pont R931, Du Pont R706, Du Pont R902+, Du Pont R103, Huntsman TR-81, Huntsman TR-28, Huntsman TR-92, Huntsman R-TC30, Huntsman R-FC5, Evonik P25, Evonik T805, Merck Eusolex T2000, Merck UV Titan M765. Preferably, Du Pont R960, Huntsman TR-92, and Huntsman TR-81 are used. Polymer particles comprising core particles can preferably be prepared according to WO 2013/170936.

Furthermore, polymer particles of the invention may comprise stabilisers. To enhance the surface stabilisation or steric repulsions of the polymeric particles in a non-polar continuous phase, a steric stabiliser is preferably incorporated into the coloured polymer particles. Preferably a non-aqueous dispersion (NAD) stabiliser is adsorbed on to the particle. Suitable NAD stabilisers are block copolymers with a comb shape structure. Especially block copolymers with a molecular weight of approximately 10,000-100,000 can be used.

Also, polymerisable stabilisers may be include, especially poly(dimethylsiloxane)macromonomers with at least one polymerisable group disclosed in WO 2013/170935.

The polymerisable composition for the preparation of polymer particles of the invention preferably comprises preferably 0.5-5%, especially 1-3% by weight of at least one light stabiliser, up to 15%, preferably 3.0-15%, especially 5.0-12% by weight of at least one polymerisable dye, 50-95%, preferably 70-90%, by weight of at least one monomer, optionally 1-40%, preferably 1-10%, by weight of crosslinking monomer, optionally 1-30%, preferably 1-10%, by weight of ionic monomer, optionally up to 30%, preferably 3.5-25%, % of at least one stabiliser, optionally 0.1-75%, preferably 40-60%, by weight of at least one organic or inorganic pigment particle, optionally 0-3%, by weight of chain transfer agent and 0.1-10%, preferably 0.1-5%, by weight of initiator, all percentages are based on the total weight of the polymerisable composition (except solvent). Advantageously, the polymerisable composition of the invention comprises a non-polar hydrocarbon solvent, especially dodecane.

Polymer particles of the invention can preferably be prepared by copolymerisation of methyl methacrylate (MMA), polymerisable HALS, especially 1,2,2,6,6-Pentamethyl-4-piperidyl methacrylate, polymerisable dyes with 2 acrylate or methacrylate groups, steric stabiliser, optionally methacrylic acid, oil soluble initiator, and optionally a chain transfer agent.

Polymer particles prepared according to the invention are preferably spherical particles with a size (diameter) in the range of 50-1300 nm and preferably with a low polydisperse size distribution. Preferred particle sizes are 50-1000 nm. Particle sizes are determined by dynamic light scattering of particle dispersions by a common apparatus such as a Malvern NanoZS particle analyser or preferably by SEM (Scanning Electron Microscopy) and image analysis.

A further subject of the invention is a process for the preparation of polymer particles. The polymer particles of the invention are preferably prepared using a dispersion polymerisation. This is a convenient single step method of preparing monodisperse particles. It is performed in a fluid which is a good solvent for the monomer and a non-solvent for the synthesised polymer particles. This solvent can also be used as the same solvent for EPD, e.g. dodecane. The preferred solvents are non-polar hydrocarbon solvents, especially such used in EPD fluids, i.e. the Isopar series (ExxonMobil), Norpar, Shell-Sol (Shell), Sol-Trol (Shell), naphtha, and other petroleum solvents, as well as long chain alkanes such as dodecane, tetradecane, decane and nonane. Especially preferred is dodecane. The concentration of the particles in the non-polar solvent can be increased if desired by centrifugation, i.e. forced settling of the particles and pouring off excess solvent, or a stirred cell filtration system can be used. The dispersion can be washed with a non-polar solvent if required. If necessary, the coloured polymer particles are simply separated from the reaction suspension by filtration, preferably by pouring the suspension through a pore size filter, i.e. a 0.1 µm pore size filter, or the particles can be cleaned by centrifuging.

All process steps described above and below can be carried out using known techniques and standard equipment which are described in prior art and are well-known to the skilled person. The selection of the polymerisation conditions depends on the required size and size distribution of the particles. Adjustment of polymerisation conditions is well known to someone skilled in the art.

Preferably the polymerisation according to the invention is a free radical polymerisation. Typical process conditions are described for the preparation of dyed polymer particles incorporating a steric stabiliser, methyl methacrylate, dye monomer and methacrylic acid: The components are added to a non-polar hydrocarbon solvent, preferably dodecane. The reaction mixture is stirred under nitrogen at 300 rpm, and then heated to 60-90, preferably 75° C. An initiator, preferably Vazo 59 or azobisisobutyronitrile is added to initiate polymerisation. The reaction is allowed to proceed for approximately 2 hours after which time the reaction is allowed to cool to room temperature. The particles are filtered through a 50 micron cloth and are cleaned by centrifugation and redispersion in dodecane if required.

Preferably, the particles are prepared by dispersion polymerisation as disclosed for example in WO 2012/019704, WO 2013/170935, and WO 2013/079146. Particles comprising a core particle, i. e. a pigment core like $TiO_2$, can preferably be prepared according to WO 2013/170936.

Particles of the invention are primarily designed for use in electrophoretic displays. So, further subjects of the invention are electrophoretic fluids and electrophoretic displays comprising the particles. A typical electrophoretic display preferably consists of the particles dispersed in a low polar or non-polar solvent along with additives to improve electrophoretic properties, such as stability and charge. Examples of such electrophoretic dispersions are well described in the literature, for example U.S. Pat. No. 7,247,379; WO 99/10767; US 2007/0128352; U.S. Pat. Nos. 7,236,290; 7,170,670; 7,038,655; 7,277,218; 7,226,550; 7,110,162; 6,956,690; 7,052,766; 6,194,488; 5,783,614; 5,403,518; 5,380,362.

Typical additives to improve the stability of the electrophoretic fluid (either by steric stabilisation or by use as a charging agent) are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (Aldrich). Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Tweaking these variables can be useful in order to change the behaviour of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachloroethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents. The preferred additives and solvents used in the formulation of the particles of the invention are OLOA11000 (Chevron Chemicals), Ircosperse 2153 (Lubrizol Ltd), and dodecane (Sigma Aldrich)

Usually electrophoretic fluids comprise a charged inorganic nanoparticle such as titania, alumina or barium sulphate, coated with a surface layer to promote good dispersibility in dielectric media and a dielectric fluid media. Furthermore, the coloured particles of the present invention may be used in combination with white reflective polymer particles prepared by a process comprising the steps of a) forming a reverse emulsion comprising at least one polymer, at least one white reflective particle, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle.

The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767 and WO 2005/017046) The Electrophoretic fluid is then incorporated into an Electrophoretic display element by a variety of pixel architectures, such as can be found in C. M. Lampert, Displays; 2004, 25(5) published by Elsevier B.V., Amsterdam.

The Electrophoretic fluid may be applied by several techniques such as inkjet printing, slot die spraying, nozzle spraying, and flexographic printing, or any other contact or contactless printing or deposition technique. Electrophoretic displays comprise typically, the electrophoretic display media in close combination with a monolithic or patterned backplane electrode structure, suitable for switching the pixels or patterned elements between the black and white optical states or their intermediate greyscale states.

The coloured polymer particles according to the present invention are suitable for all known electrophoretic media and electrophoretic displays, e.g. flexible displays, TIR-EPD (total internal reflection electrophoretic devices), one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

Particles of the invention may also be used in optical, electrooptical, electronic, electrochemical, electrophotographic, electrowetting displays and/or devices, e.g. TIR (total internal reflection electronic devices), and in security, cosmetic, decorative, and diagnostic applications. The use in electrowetting displays is preferred. Electrowetting (ew) is a physical process where the wetting properties of a liquid droplet are modified by the presence of an electric field. This effect can be used to manipulate the position of a coloured fluid within a pixel. For example, a nonpolar (hydrophobic) solvent containing colourant can be mixed with a clear colourless polar solvent (hydrophilic), and when the resultant biphasic mixture is placed on a suitable electrowetting surface, for example a highly hydrophobic dielectric layer, an optical effect can be achieved. When the sample is at rest, the coloured non-polar phase will wet the hydrophobic surface, and spread across the pixel. To the observer, the pixel would appear coloured. When a voltage is applied, the hydrophobicity of the surface alters, and the surface interactions between the polar phase and the dielectric layer are no longer unfavourable. The polar phase wets the surface, and the coloured non-polar phase is thus driven to a contracted state, for example in one corner of the pixel. To the observer, the pixel would now appear transparent. A typical electrowetting display device consists of the particles in a low polar or non-polar solvent along with additives to improve properties, such as stability and charge. Examples of such electrowetting fluids are described in the literature, for example in WO2011/017446, WO 2010/104606, and WO2011075720.

The disclosures in the cited references are expressly also part of the disclosure content of the present patent application. The following examples explain the present invention in greater detail without restricting the scope of protection.

EXAMPLES

All reagents are purchased from Sigma-Aldrich, UK unless otherwise stated. 1,2,2,6,6-Pentamethyl-4-piperidyl methacrylate HALS is obtained from Tokyo Chemical Industry UK. Vazo 67 is obtained from Wako Chemicals. Decorative NAD stabiliser 30% by weight in solvents (obtained from ICI Ltd., product code X190-442) is precipitated in cold methanol, dried and dissolved in a 50:50 mixture of ethyl acetate (Aldrich) and butyl acetate (Aldrich).

Dye 1 is prepared as reported in example 1 of WO 2013/170935 and has the following structure:

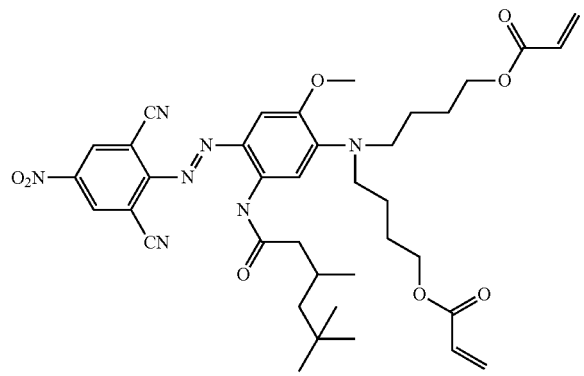 [SMILES: C=CC(=O)OCCCCN(CCCCOC(=O)C=C)c1cc(NC(=O)CC(C)CC(C)(C)C)c(/N=N/c2c(C#N)cc([N+](=O)[O-])cc2C#N)cc1OC]

NMR Spectroscopy is carried out using a Malvern 300 (GH000103) NMR Spectroscope.

SEM is carried out on a Neoscope JCM-5000 Scanning Electron Microscope.

Centrifugation is carried out on a Heraeus Biofuge Stratos Centrifuge.

Photostability Tests

Photostability tests are carried out using an Atlas CPS+ Suntest.

Colour measurements are carried out using the x-rite.

Comparative Blue Wool samples are acquired from SDC Enterprises Limited, UK, which conform to the requirements of BS EN ISO 105 B08. A Blue Wool Scale must be measured with every photostability test carried out. It is used to measure and calibrate the permanence of coloured dyes. Eight samples of dyed blue wool are used, which incorporate dyes that have sequentially improved photostability over time. Samples are labelled from 1 to 8; a score of zero denotes extremely poor colour fastness, whereas a sample with a score of 8 is deemed not to have altered and can be considered lightfast and permanent. In industry, a score of 5 or better is considered good, but preferably scores of 6 or higher should be achieved. Photostability testing procedure is developed to conform as closely as possible to parameters set out in the International Standard IEC 60068-2-5: Environmental Testing—Part 2-5: Tests—Test sA: Simulated solar radiation at ground level and guidance for solar radiation testing.

Samples are prepared by filling a 50 micron ITO-glass cell with the formulated fluid of Examples 3 or 4. The cell is sealed using Araldite glue and checked to ensure no bubbles have formed within the cell. Cells using non-density matched samples are allowed to settle overnight in the dark, in order to prevent anomalous results from a change in colour due to particle settling.

The Blue Wool scale is assembled behind a sheet of ITO glass, ITO side down.

Samples are placed flat on a matt black (anodised aluminium) sample holder in the Suntest for 20 hr periods, with a radiation dose of 550 W/m$^2$ (mimicking 1 hr Miami Peak Sunlight, equivalent to 4 hrs daylight exposure in the UK). Samples are then kept in the dark for a minimum of four hours, before the colour coordinate is measured on the x-rite, and cycled again over a period of 10 days. This is the procedure recommended in IEC 60068-2-5 for experiments where the principal interest is in degradation effects. All samples are kept in the same position, at the same orientation throughout the experiments. X-rite measurements are taken on the same side of the cells and samples, with the blue wool and print scales behind a piece of ITO glass. A metal guide is used to ensure samples are measured in the same position each time.

A cooling plate is used underneath the samples, which it set at 15° C.

A testo 175H1 temperature and humidity data-logger is affixed inside the Suntest to monitor ambient conditions.

The L*a*b* colour coordinate is used to measure the ΔE value of each sample. This value measures the change from the initial baseline colour coordinate measured before any fade is induced on the sample at each time period it is measured.

Example 1

(Comparative Example): Preparation of Dyed Polymer Particles Incorporating Dye 1 at 5 Weight % (Based on Methyl Methacrylate) by Dispersion Polymerisation NAD stabiliser 30% by weight is precipitated in cold methanol, dried and dissolved in a 50:50 mixture of ethyl acetate and butyl acetate. Methyl methacrylate (20.58 g), NAD-Stabiliser (3.50 g) and methacrylic acid (0.42 ml) are charged to a 100 ml 3-necked flask equipped with a condenser, nitrogen flow, and an overhead stirrer. Dye 1 (1.03 g) is added and stirred for 1 minute to facilitate dissolution of the dye. Dodecane (25.20 g) is added to the flask, followed by 1-octanethiol (0.13 ml). The mixture is heated with stirring at 300 rpm, once the temperature in the flask is at 75° C., Vazo 67 (0.20 g) is added and the reaction is stirred for 2 hours. The resulting dispersion is filtered through a 50 micron cloth. The dispersion is cleaned using a centrifuge. Centrifugations are carried out at 10 000 rpm for 20 minutes each, replacing the supernatant with dodecane; this is repeated five times. Average particle size is measured by SEM and image analysis: 456 nm.

Example 2

Preparation of Dyed Polymer Particles Incorporating Dye at 5 Weight % and HALS Monomer 1,2,2,6,6-Pentamethyl-4-Piperidyl Methacrylate at 1 Weight % (Based on Methyl Methacrylate) by Dispersion Polymerisation Methyl methacrylate (20.58 g), NAD-stabiliser (3.50 g) and methacrylic acid (0.42 ml) are charged to a 100 ml 3-necked flask equipped with a condenser, nitrogen flow, and an overhead stirrer. 1,2,2,6,6-Pentamethyl-4-piperidyl methacrylate HALS (0.21 g) and Dye 1 (1.03 g) are added and stirred for 1 minute to facilitate dissolution of the dye. Dodecane (25.20 g) is added to the flask, followed by 1-octanethiol (0.13 ml). The mixture is heated with stirring at 300 rpm, once the temperature in the flask is at 75° C., Vazo 67 (0.20 g) is added and the reaction is stirred for 2 hours.

The resulting dispersion is filtered through 50 micron cloth. The dispersion is cleaned using a centrifuge. Centrifugations are carried out at 10 000 rpm for 20 minutes each, replacing the supernatant with dodecane; this is repeated five times. Average particle size is measured by SEM and image analysis: 456 nm.

Table 3: Similarly prepared are the following cyan coloured polymer particles (5 weight % of dye compared to MMA), additionally containing the following HALS (weight % based on methyl methacrylate).

TABLE 3

| Example Number | HALS | % Incorporation |
| --- | --- | --- |
| Example 3 | 1,2,2,6,6-Pentamethyl-4-piperidyl Methacrylate | 2% |
| Example 4 | 1,2,2,6,6-Pentamethyl-4-piperidyl Methacrylate | 3% |
| Example 5 | 1,2,2,6,6-Pentamethyl-4-piperidine | 1% |

FIG. 1 shows that inclusion of HALS in the dispersion polymerisation does not hinder the polymerisation.

Reactions are monitored by NMR-Spectroscopy, with samples being taken at the start, mid-point and end of the reaction. The results show no significant hindrance of reaction, although the rate of reaction becomes slower on addition of 3% HALS:

Example 6

Preparation of Reflective Particles Incorporating Dye 1 at 3 Weight % and HALS at 1 Weight % (Based on Methyl Methacrylate) by Dispersion Polymerisation Polydimethylsiloxane monomethacrylate terminated, mw. 10,000 (Gelest, 2.08 g), dodecane (75 g), titanium dioxide (10.30 g), and Span 85 (0.515 g) are charged to a 250 ml 3-neck round bottom flask. The flask is fitted with an overhead stirrer, condenser and nitrogen bubbler. The flask is placed in an ultrasonic bath and is subjected to 100% power ultrasound (37 Hz) for 30 minutes, followed by degassing for 30 minutes, by bubbling nitrogen through the dispersion with a needle.

In a separate flask, methyl methacrylate (10.3 g), AIBN (0.214 g), 1,2,2,6,6-Pentamethyl-4-piperidyl Methacrylate HALS (0.103 g), and octane thiol (0.126 ml) are combined and degassed as above for 30 minutes. The dispersion flask is placed in the sonic bath at 80° C., and the contents are stirred with an overhead stirrer at 300 rpm, under a flow of nitrogen. The monomer solution is then added to this dispersion at a rate of 3.8 mL/hour using a syringe pump. The reaction is stirred for four hours from the start of addition.

On completion, the flask is allowed to cool to room temperature and the contents are filtered through a 50 micron cloth. The dispersion is cleaned by centrifugation. Centrifugations are carried out at 10 000 rpm for 20 minutes each, replacing the supernatant with dodecane; this is repeated five times.

Example 7

Electrophoretic Formulation Containing a Dispersion of Cyan Coloured Particles Incorporating HALS (Mobility and Colour Coordinate Measurements)

The electrophoretic ink is prepared by vortex mixing 0.1012 g of particles of Example 2 comprising Dye 1 and HALS, 0.0609 g of Dioctyl sulfosuccinate sodium salt (AOT, Sigma Aldrich), and 1.8696 g of dodecane (Sigma Aldrich).

Colour data for this dispersion is measured using the x-rite and summarised in Table 4.

TABLE 4

| L* | a* | b* | X | Y | Z | x | y |
| --- | --- | --- | --- | --- | --- | --- | --- |
| 47.52 | −32.19 | −23.29 | 10.699 | 16.421 | 31.425 | 0.183 | 0.280 |

The dispersion is allowed to stir overnight on the roller-mixer, before being further diluted in dodecane (ca. 1 drop in 2 ml) and roller-mixed overnight. The sample is measured on the zeta sizer:

Electrophoretic Mobility (−0.02638 μmcm/Vs), Zeta Potential (+28.4 mV)

Example 8

Electrophoretic Formulation Containing a Dispersion of Cyan Coloured Particles Incorporating HALS into the Particle (Photostability Measurement)

The electrophoretic ink is prepared by vortex mixing 0.2107 g of particles of Example 2 comprising Dye 1 and HALS, 0.0636 g of Dioctyl sulfosuccinate sodium salt (AOT, Sigma Aldrich), and 1.8403 g of dodecane (Sigma Aldrich). The dispersion is then roller mixed for 30 minutes.

The sample is used in photostability tests.

Example 9

Electrophoretic Formulation Containing a Dispersion of Cyan Coloured Particles and 1,2,2,6,6-Pentamethyl-4-Piperidine (Non-Reactive HALS) (Photostability Measurement)

The electrophoretic ink is prepared by vortex mixing 0.2136 g of particles of Example 1 comprising Dye 1 at 5%, 0.0215 g 1,2,2,6,6-Pentamethyl-4-piperidine (Sigma Aldrich), 0.0643 g of Dioctyl sulfosuccinate sodium salt (AOT, Sigma Aldrich), and 1.8397 g of dodecane (Sigma Aldrich). The dispersion is then roller mixed for 30 minutes.

The sample is used in photostability tests.

Example 10

Electrophoretic Formulation Containing a Dispersion of Cyan Coloured Particles Incorporating HALS (Photostability Measurement, Density Matched)

The electrophoretic ink is prepared by vortex mixing particles of Example 2 comprising Dye 1 and HALS, Dioctyl sulfosuccinate sodium salt (AOT, Sigma Aldrich), Halocarbon Oil and dodecane (Sigma Aldrich). The dispersion is then roller mixed for 30 minutes.

The sample is used in photostability tests.

Example 11

Measurement of a Blue Wool Scale for Use in Photostability Tests

The blue wool standards are placed in the Suntest with the particle samples that are being tested for their photostability. The degree is fade is measured for all samples, and the fade pattern gained for the samples is compared to the fade patterns gained for the Blue Wool Standards. Samples are then given a score depending on how their fade compares.

Figure 2:
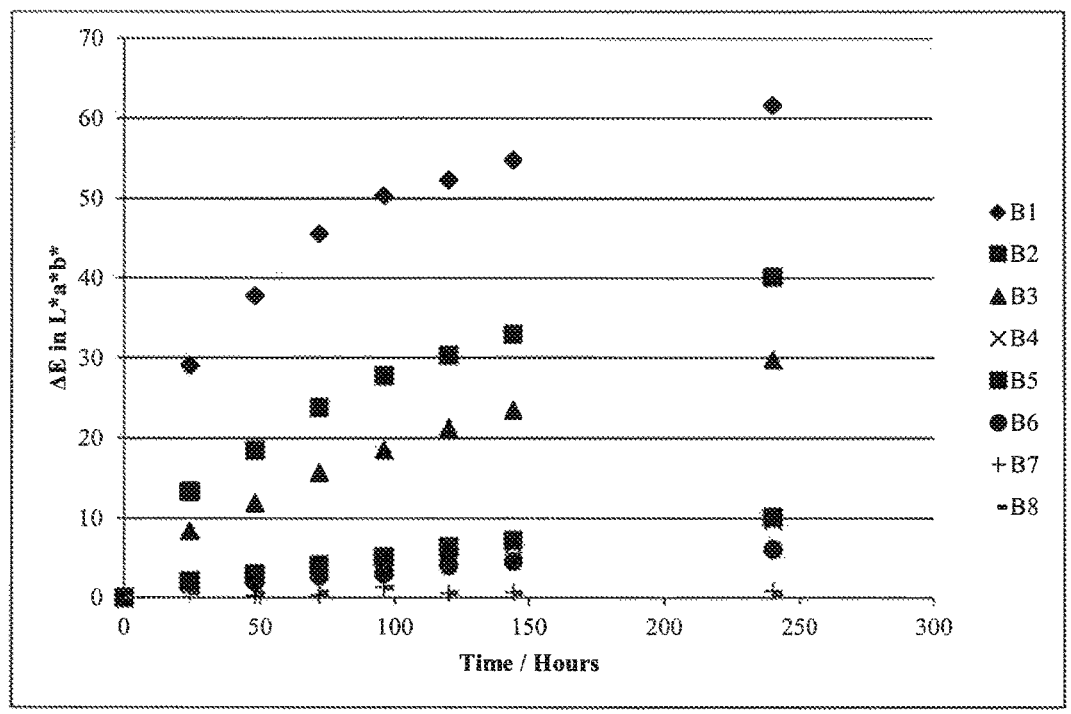

Blue Wool Scale measured for the test described in examples 12-18 is shown in FIG. 2.

Examples 12-18

Photostability Test of Cyan Dye Containing Particles, with HALS Incorporated into the Particle or into the Formulation The photostability test is carried out using samples as described in Table 5:

TABLE 5

| Example | Particle Type | HALS Used | % HALS | Formulation Type |
|---|---|---|---|---|
| Example 12 | Example 1 | N/A | 0% | Example 8 |
| Example 13 | Example 2 | 1,2,2,6,6-Pentamethyl-4-piperidyl Methacrylate | 1% | Example 8 |
| Example 14 | Example 3 | 1,2,2,6,6-Pentamethyl-4-piperidyl Methacrylate | 2% | Example 8 |
| Example 15 | Example 4 | 1,2,2,6,6-Pentamethyl-4-piperidyl Methacrylate | 3% | Example 8 |
| Example 16 | Example 1 | 1,2,2,6,6-Pentamethyl-4-piperidine | 1% | Example 9 |
| Example 17 | Example 1 | 1,2,2,6,6-Pentamethyl-4-piperidine | 2% | Example 9 |
| Example 18 | Example 1 | 1,2,2,6,6-Pentamethyl-4-piperidine | 3% | Example 9 |

These samples are measured against a Blue Wool Scale. Photostability scores for these particles are shown in Table 6 (higher BW values show better photostability).

TABLE 6

| Example | % HALS | HALS Location | Score |
|---|---|---|---|
| Example 12 | 0% | N/A | BW4+ |
| Example 13 | 1% | Particle | BW6+ |
| Example 14 | 2% | Particle | BW6 |
| Example 15 | 3% | Particle | BW6 |
| Example 16 | 1% | Formulation | BW5+ |
| Example 17 | 2% | Formulation | BW4+ |
| Example 18 | 3% | Formulation | BW5+ |

The results show that particles with HALS bound into them show improved photostability.

Surprisingly, only 1% HALS incorporation is required to see this effect. Increasing the %-HALS incorporation does not improve the photostability further.

Unexpectedly, presence of a non-polymerisable HALS molecule in formulations of cyan containing dyed particles shows no, or very little, improvement in the photostability of the particles. Any small improvement shown is not comparable to that shown by incorporation of HALS into the particle.

This shows that, to improve photostability, the HALS molecule must be bound into the particle.

Figure 3:
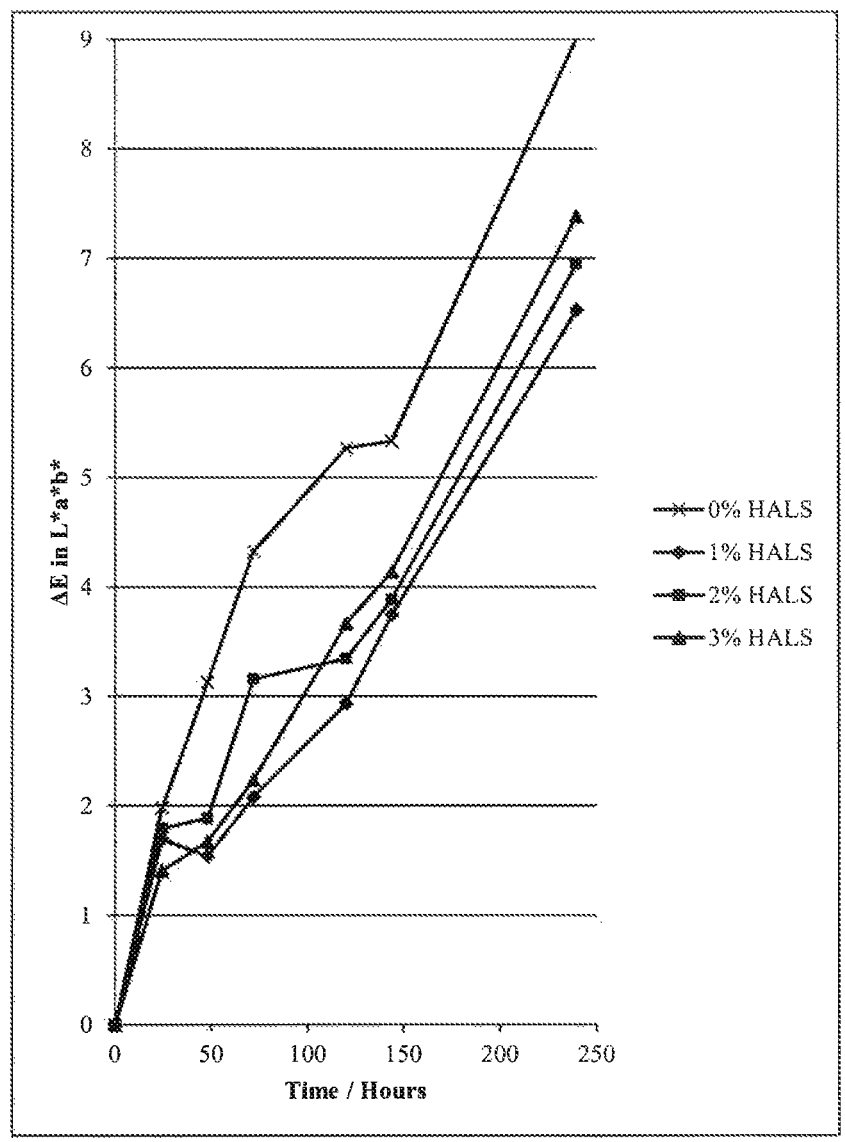
Figure 4:
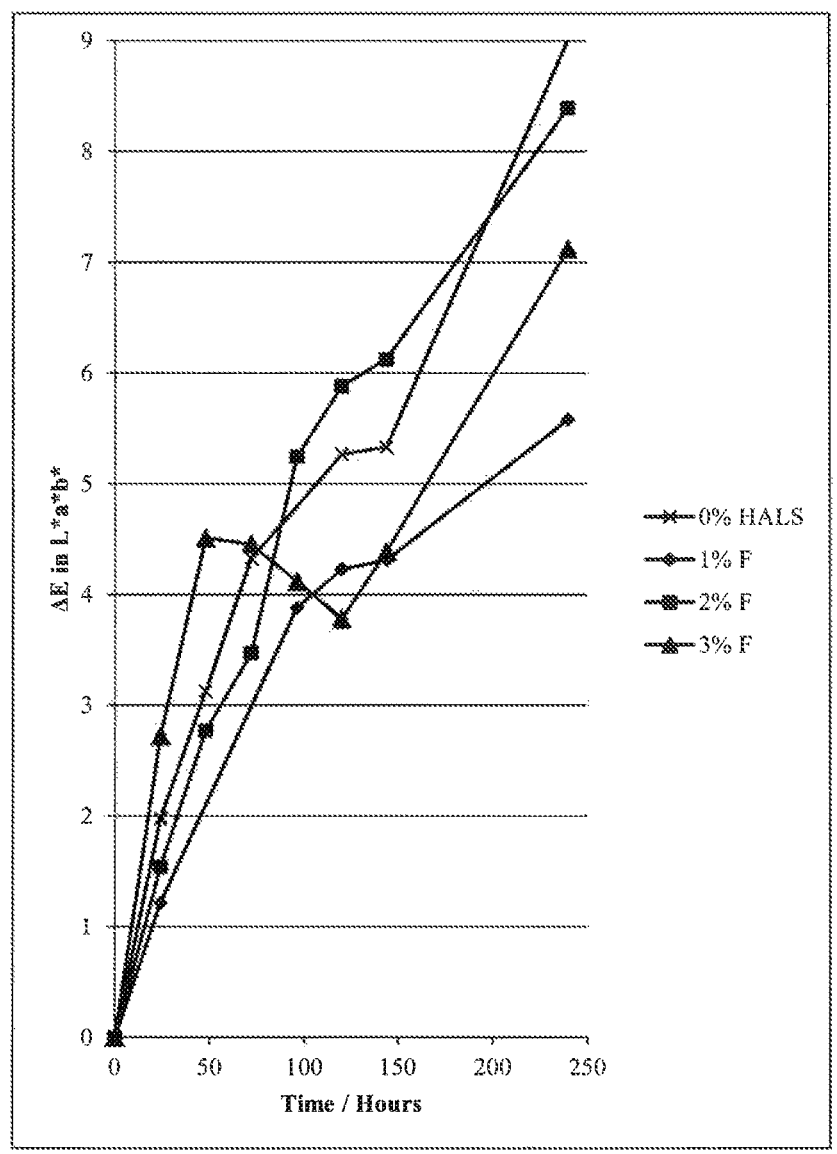

FIGS. 3 and 4 summarise these results.

FIGURES

FIG. 1: Reaction Progress with Increasing % HALS

FIG. 2: Blue Wool Scale measured for the test described in Example 12

FIG. 3: Improvement in photostability for particles incorporating HALS

FIG. 4: Photostability for particles incorporating HALS into the formulation—no marked improvement

The invention claimed is:

1. An electrophoretic fluid comprising coloured polymer particle consisting of monomer units of 0.5 -5% by weight based on the total weight of the polymerizable composition except solvent, of at least one polymerisable light stabiliser, monomer units of at least one monomer, monomer units of at least one polymerisable dye, optionally at least one core particle, optionally monomer units of at least one charged co-monomer, and optionally, monomer units of at least one crosslinking co-monomer, and optionally of at least one optionally polymerizable steric stabilizer, and wherein the coloured polymer particle has a colorfastness of ≥6 according to the Blue Wool Scale.

2. The electrophoretic fluid according to claim 1, wherein the polymerisable light stabiliser is polymerisable hindered amine.

3. The electrophoretic fluid according to claim 1, wherein the polymerisable light stabiliser is a compound of Formula 1

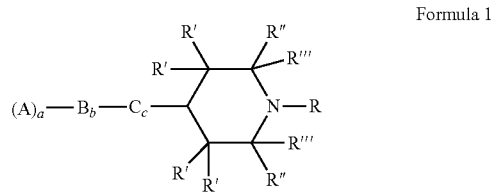

Formula 1 where

R is H, linear or branched, substituted or non-substituted alkyl, cycloalkyl, or aryl, halogen, hydroxy or alkoxy, R' is independently H or linear or branched, substituted or non-substituted alkyl, preferably H, R" is independently H or linear or branched, substituted or non-substituted alkyl, R'" is independendy H or linear or branched, substituted or non-substituted alkyl, A is a polymerisable group, B is a spacer group, C is a single bond or O, NH, NR', or $CH_2$, and a ≥1, and b and c ≥0.

4. The electrophoretic fluid according to claim 1, wherein the polymerisable light stabiliser is a compound of Formula 2

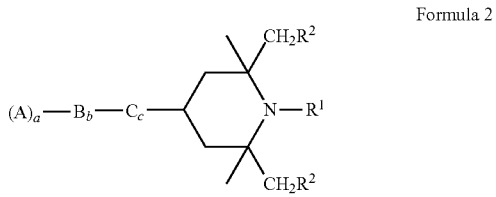

Formula 2 where $R^1$ is H, linear or branched, substituted or non-substituted alkyl, $R^2$ is independently H or linear or branched, substituted or non-substituted alkyl, A is a polymerisable group selected from acrylate, methacrylate, acrylamide or methacrylamide groups, B is a spacer group, C is a single bond or O, NH, NR', or $CH_2$, and a ≥1, and b and c≥0.

5. The electrophoretic fluid according to claim 1, wherein the polymerisable light stabiliser is a compound of Formula 3

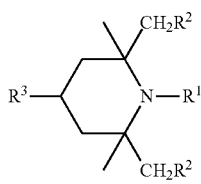

Formula 3 wherein $R^1$ is H, linear or branched, substituted or non-substituted alkyl, $R^2$ is independently H or linear or branched, substituted or non-substituted alkyl, and $R^3$ is a polymerisable group.

6. The electrophoretic fluid according to claim 1, wherein the polymerisable light stabilizer is 1,2,2,6,6-pentamethyl-4-piperidyl methacrylate.

7. The electrophoretic fluid according to claim 1, wherein the at least one core particle is an organic or inorganic pigment particle.

8. The electrophoretic fluid according to claim 1, wherein the at least one polymerisable dye comprises a chromophore, at least one polymerisable group, optionallyat least one linker group, and optionallyat least one charged group.

9. A process for the preparation of the coloured polymer particle according to claim 1 for use in electrophoretic devices, comprising
   a) polymerising at least one monomer, at least one polymerisable light stabiliser, at least one initiator, at least one polymerisable dye, optionally at least one charged co-monomer, optionally at least one core particle, optionally at least one optionally polymerizable steric stabiliser and optionally at least one crosslinking co-monomer by dispersion or emulsion polymerisation in a non-aqueous, non-polar solvent, and
   b) optionally washing and drying the polymer particles, wherein the dispersion consists of 0.5 -5% by weight of at least one polymerizable light stabiliser, up to 15% by weight of at least one polymerizable dye,50 -90% by weight of at least one monomer, optionally 1 -40% by weight of crosslinking monomer, optionally 1 -30% by weight of ionic monomer, optionally up to 30% of at least one stabilizer, optionally 0.1 -75% by weight of at least one organic or inorganic pigment particle, wherein all percentages are based on the total weight of the polymerizable composition except solvent.

10. A method comprising utilizing a coloured polymer particle prepared by the process according to claim 9 in optical, electrooptical, electronic, electrochemical, electrophotographic, electrowetting and electrophoretic displays, and in security, cosmetic, decorative, and diagnostic applications.

11. The electrophoretic fluid comprising polymer particles prepared by the process according to claim 9.

12. An electrophoretic display device comprising the electrophoretic fluid according to claim 1.

13. The electrophoretic display device according to claim 12, wherein the electrophoretic fluid is applied by a technique selected from the group consisting of inkjet printing, slot die spraying, nozzle spraying, and flexographic printing, and contact or contactless printing or deposition technique.

14. Electrophoretic fluid according to claim 1, wherein the coloured polymer particles have a particle size of 50 nm to less than 1000 nm.

15. An electrophoretic fluid comprising coloured polymer particle consisting of monomer units of at least one polymerisable light stabiliser, monomer units of at least one monomer, monomer units of at least one polymerisable dye, optionally at least one core particle, optionally monomer units of at least one charged co-monomer, and optionally, monomer units of at least one crosslinking co-monomer, and optionally of at least one optionally polymerizable steric stabilizer, and wherein the particles are obtained from a dispersion comprising 0.5 -5% by weight of at least one polymerizable light stabiliser, up to 15% by weight of at least one polymerizable dye, 50 -90% by weight of at least one monomer, optionally 1 -40% by weight of crosslinking monomer, optionally 1 -30% by weight of ionic monomer, optionally up to 30% of at least one stabilizer, optionally 0.1 -75% by weight of at least one organic or inorganic pigment particle, wherein all percentages are based on the total weight of the polymerizable composition except solvent, and wherein the coloured polymer particle has a colorfastness of ≥6 according to the Blue Wool Scale.

16. The electrophoretic fluid according to claim 1, wherein the at least one monomer is selected from methyl methacrylate, ethyl methacrylate, methacrylic acid, n-butyl methacrylate, methyl acrylate, ethyl acrylate, acrylic acid, and/or n-butyl acrylate, 2-methacryloxy ethyl trimethyl ammonium chloride (MOTAC), acryloxy ethyl trimethyl ammonium chloride (AOTAC) and [2-(methacryloyloxy) ethyl] trimethylammonium methyl sulfate solution.

* * * * *